United States Patent [19]

Chisholm

[11] 3,999,699
[45] Dec. 28, 1976

[54] METHOD OF MAKING HIGH THERMAL CONDUCTIVITY POROUS METAL

[76] Inventor: John Chisholm, River Terrace Lane, Jupiter, Fla. 33458

[22] Filed: Dec. 8, 1975

[21] Appl. No.: 638,923

[52] U.S. Cl. .............................. 228/173; 228/183; 228/190; 29/163.5 R

[51] Int. Cl.² ........................................ B23P 15/26

[58] Field of Search ............... 29/163.5 R, 163.5 F; 228/173, 178, 183, 190, 209, 263, 158, 170

[56] References Cited

UNITED STATES PATENTS

| | | | |
|---|---|---|---|
| 3,049,796 | 8/1962 | Pall | 29/163.5 F X |
| 3,050,115 | 8/1962 | Leitzel | 228/190 X |
| 3,095,283 | 6/1963 | Wheeler, Jr. | 29/163.5 F X |
| 3,266,130 | 8/1966 | Glaze | 29/163.5 R |
| 3,390,447 | 7/1968 | Mears | 228/190 X |
| 3,416,218 | 12/1968 | Armenoff et al. | 228/263 X |
| 3,690,606 | 9/1972 | Pall | 29/163.5 F X |

Primary Examiner—Al Lawrence Smith
Assistant Examiner—K. J. Ramsey
Attorney, Agent, or Firm—Raymond N. Matson

[57] ABSTRACT

An improved method of making a high heat transfer surface composed of metal mesh is described. The surface comprises multiple layers of wire mesh, stacked and laminated together by silver brazing. Advance in the state-of the-art is the novel manufacturing process designed to maximize heat transfer. Prior knowledge on manufacture of porous metal laminates has principally had as its purpose the filtration of particulate or control of hydraulic boundry-layer and made use of sintering techniques to solidify the elements. This invention optimizes the use of materials and process to accomplish maximum heat transfer.

6 Claims, 3 Drawing Figures

METHOD OF MAKING HIGH THERMAL CONDUCTIVITY POROUS METAL

A secondary application of the invention is the formation of metallic filtration material designed for filtering under controlled temperature conditions. Careful selection of wire size, weave (hole spacing) calendering and layer orientation as well as the brazing process — provide the necessary constituents for control of particulate size. The method is in contrast to that disclosed in U.S. Pat. No. 2,925,650 issued to David B. Pall (1960) in which layers of the laminate are fused together by sintering.

SUMMARY OF THE INVENTION

The invention relates primarily to fabrication of a unique type of compact heat exchanger or heat sink whose convective surface comprises a matrix of wires tightly packaged in small volume. When forced air is passed through the matrix the flow conditions become turbulent at relatively low gas velocity thereby providing superior heat transfer from wire of the matrix to the cooling medium. Layers of the mesh are bonded together by silver brazing which provides superior thermal conductivity across the intersections (discontinuities) of the warp and woof wires and between the layers of the laminate. It also hardens the surface of the copper making subsequent machining less susceptible to air blockage by metal smearing. In some instances the wire mesh is calendered to increase bonding area between individual wires and between layers of the laminate. A further step involving control of the furnace atmosphere provides a reducing condition beneficial in the removal of oxygen from the copper thereby maximizing its electrical and thermal conductivity. It should be noted that pure silver is practically the only metal which can be alloyed with copper without seriously impairing the conductivity of the copper; silver bearing brazing alloys possess this quality to a much lesser degree.

In applications where the use of the porous metal is particulate filtering under controlled temperature conditions — two or more calendering operations are generally made, one before brazing and one or more after brazing. The initial roll maximizes the area of contact at thermal path discontinuities and fixes the location of the wires in the mesh — subsequent calendering results in establishing the ultimate size of the openings. Using this technique it is possible to make filters with uniform openings down to a few microns. Where very fine filaments are used it is advantageous to include one or more lamina of coarser wire to insure structural strength.

In the drawings, I have shown the woven wire mesh lamina at various stages of its formation into a laminated porous metal panel. In these showings:

The hole is made in anticipation of being filled with copper (flame-sprayed) for purposes of attachment to the heat source (or sink) device. See petitioner's U.S. Pat. No. 3,928,907 for complete description. Pt. 1 is the stepped laminate, Pt. 2 is the conventional sheet laminate, Pt. 3 is the flame-sprayed filler.

Figure 1:
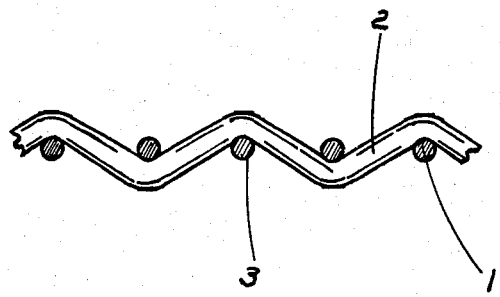
FIG. 1 is a fragmentary side elevational view of a woven wire mesh lamina which has been calendered and electroplated.

The wire mesh is calendered to flaten the constituent wires such that the area of contact between the warp 1 and woof 2 (FIG. 1) is increased over that of a circular cross section. Likewise, flattening increases the attainable area of contact between the stacked layers of the laminate. Increased area of contact is significant in heat transfer application because it minimizes the thermal resistance both within the wire fabric and between the layers of the laminate.

The mesh is then chemically cleaned. It is necessary that the wire be immaculate to obtain satisfactory electroplating. A number of cleaning processes can be used, a preferred and low cost procedure is as follows:

The first step is vapor degreasing, this is followed by dipping the mesh in a solution of ammonia persulfate. All traces of soil and scale are removed and the metal surface is activated to receive the silver. The wire is then put in a silver strike bath. A preferred bath formula which meets the requirements of economy is as follows:

| | |
|---|---|
| Silver cyanide | 0.5–0.7 oz./gal. |
| Potassium Cyanide | 10–12 oz/gal. |
| Temperature | 70–85° F |
| Current density | 15–25 amp./sq.ft. |
| Voltage | 4–6 volts |

Following the strike operation the wire is plated. Satisfactory coatings of silver may be obtained over a wide range of solution concentrations and varying conditions depending on the desired rate of deposition. As this application requires a fairly heavy deposit 3 (FIG. 1) of silver (approx. 0.001 inch thickness) a high speed bath is desired. A perferred plating formulation is as follows:

| | |
|---|---|
| Silver cyanide | 10–15 av. oz./gal. |
| Potassium cyanide | 12–18 oz./gal. |
| Potassium carbonate (min) | 2 oz./gal. |
| Potassium hydroxide | 0.4 oz./gal. |
| Metallic silver | 7.5–11.5 tr. oz./gal. |
| Free cyanide | 7–12 oz./gal. |
| Temperature | 100–120° F |
| Current density | 50–100 amp./sq. ft. |

The bath should be agitated either by cathode rod oscillation or by pumping the solution through a perforated stainless steel pipe located at the bottom of the tank. The silver anode area should be at least equal to the surface being plated and preferably, should be twice the cathode area. Proper operation of the bath requires analyses at regular intervals to maintain the silver and free cyanide content. This also applies to the strike solution. In potassium solutions, carbonates will begin to show an adverse effect on the current density at values of 12 to 15 oz./gal. Removal of excess carbonates can be accomplished by use of barium cyanide. Following the plating operation, the wire should be washed in clean water, air dried and packed in a clean, neutral material container while waiting for the brazing operation.

Figure 2:
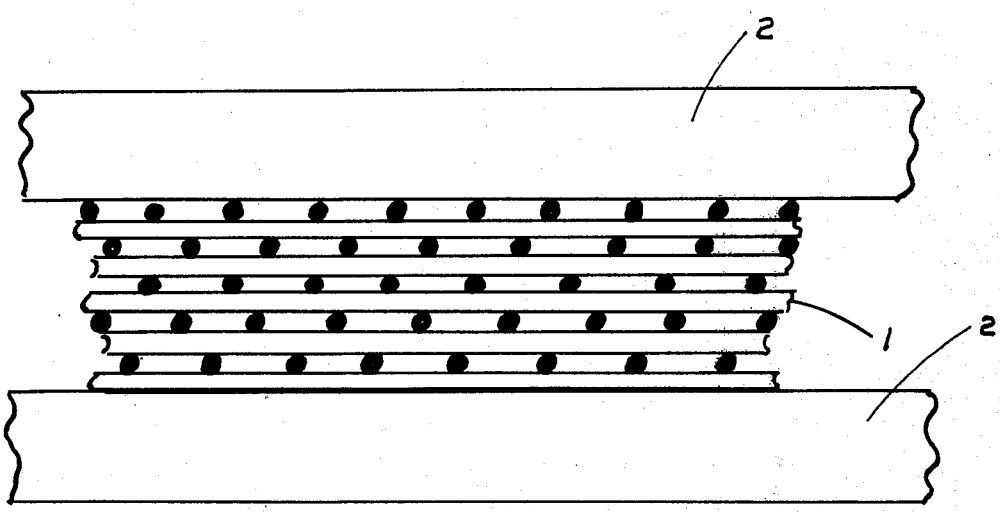
FIG. 2 is a fragmentary side elevational view of randomly stacked lamina positioned between refractory platens preparatory to brazing.

The brazing operation is preferably done on a belt conveyor in a hydrogen atmosphere furnace of such type as manufactured by C. I. Hayes Co. The furnace is electrically fired and held at a temperature of 1760° to 1800° F. The belt speed is such that the laminate is in the hot zone of the furnace for approximately 10 minutes. The layers 1 (FIG. 2) are stacked between two slabs 2 of refractory ceramic such as manufactured by Western Gold and Platinum Co., Type VX, ½ inch thick. Openings in the mesh are randomly staggered such as to provide a tortuous path for the cooling gas in the completed laminate. The laminate is bonded and ready for trimming to desired panel size as soon as it has passed through the furnace and cooled. Trimming is best done on a band saw.

Figure 3:
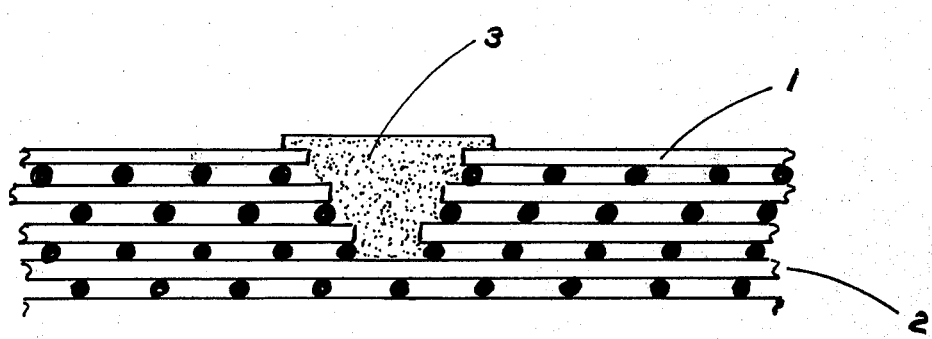
FIG. 3 is a fragmentary side elevational view, partly in section, of stacked lamina arranged in a non-coextensive manner to form a channel for the reception of a flame-sprayed deposition reaching all lamina layers.

In those cases where it is anticipated the laminate will be used in conjunction with U.S. Pat. No. 3,928,907 "A Method of Making Thermal Attachment to Porous Metal Surfaces" the laminate stacking may be done in such a manner as to provide a channel or stepped-hole in the panel (numerals 1 and 2, FIG. 3) to allow deposition of a flame-sprayed surface 3 of copper, etc. for purposes of attachment to the heat source (or sink) device.

In those cases where the laminate has been made for filtering purposes a secondary calendering (or otherwise compressing) operation is necessary after the brazing. The result of the rolling is to uniformly reduce the pore dimensions to the degree that particulate of a given size and larger will be unable to pass through in a transverse direction. Manufacturing control of the calendering process is essential for uniformity of filter performance. Controlled heat may be introduced (or extracted) from the fused laminate by addition of a flame-sprayed pad as shown in U.S. Pat. No. 3,928,907.

Although I have illustrated preferred embodiments of my invention it will occur to those skilled in the art that other modifications may be made without departing from the scope of the invention, and that it is not my intention to limit the invention other than as necessitated by the scope of the appended claims.

What I claim as new and desire to secure by Letters Patent of the United States is:

1. The process for making a laminated porous metal panel from wire lamina of high electrical and thermal conductivity, said process comprising the steps of cleaning the wire lamina by vapor degreasing; stacking a plurality of said lamina to form a panel including arranging the upper layers of the said stacked lamina in a non-coextensive manner with respect to the bottom layer so as to form a channel in the final panel upper surface for the reception of a flame-sprayed deposition; calendering the lamina; and brazing the stacked lamina in a hydrogen atmosphere furnace.

2. The process recited in claim 1 wherein the lamina is calendered after brazing to restrict transverse passage of particulate in accordance to a desired particle size.

3. The process recited in claim 1 wherein said lamina are electroplated with approximately 0.001 inch of silver before being stacked.

4. The process for making a laminated porous metal panel from wire lamina of high electrical and thermal conductivity, said process comprising the steps of cleaning the wire lamina by vapor degreasing; stacking at least three of said lamina to form a panel and providing the uppermost layers of the lamina with concentric holes of successively increasing size from the bottom lamina layer for the reception of a flame-sprayed deposition; calendering the lamina; and brazing the stacked lamina in a hydrogen atmosphere furnace.

5. The process recited in claim 4 wherein the lamina is calendered after brazing to restrict transverse passage of particulate in accordance to a desired particle size.

6. The process recited in claim 4 wherein said lamina are electroplated with approximately 0.001 inch of silver before being stacked.

* * * * *